United States Patent Office 3,689,232
Patented Sept. 5, 1972

3,689,232
JOINTING MATERIALS FOR STEEL AND ALUMINUM
Nobuyoshi Baba, Makoto Adachi, and Hideo Nagata, Shigaken, Japan, assignors to Asahi Kasei Kogyo Kabushiki Kaisha, Osaka, Japan
No Drawing. Filed July 9, 1971, Ser. No. 161,915
Int. Cl. B32b 15/00
U.S. Cl. 29—196    7 Claims

ABSTRACT OF THE DISCLOSURE

Jointing materials for steel with aluminum which do not require so severe carefulness in jointing and withstand a higher temperature can be produced by jointing layers of steel, titanium and aluminum by explosive welding and they are used by placing between to-be-jointed steel and aluminum and welding the aluminum part thereof with the to-be-jointed aluminum and the steel part thereof with the to-be-jointed steel.

---

This invention relates to joints or jointing materials useful to easen jointing-by-welding of pipes, rods or plates of carbon steel or stainless steel (which will be simply referred to hereinafter as steel) with pipes, rods or plates of aluminum.

Heretofore, it has been unable to weld steel and aluminum by a common welding procedure. A friction welding process and a welding process in which a special alloying treatment is simultaneously applied, have been used for such purposes. In these methods, however, there are drawbacks not only in the limitation as to size but also in the strength of welded products and hence in weakness to heat and impact.

On this account, various improvements have been attempted and recently properties have been greatly improved by an explosive welding. In other words, a joint or jointing material of steel and aluminum, prepared according to an explosive welding is placed between a steel and an aluminum material to be jointed and if the steel is welded with the steel and the aluminum with the aluminum, there is no brittle alloy layer on the contact surface between steel and aluminum because it is the surface adhered by the explosion pressure. Accordingly, a joint which is stronger against outer forces and also against heat can be obtained compared with conventional processes.

However, even this joint, when brought under a further severe condition, becomes deteriorated and unusable on account of thermal stress and formation of alloy.

For example, joints between different materials used for joining iron eelctrodes for aluminum electrolysis cells and aluminum bus bars could be usable when they could withstand a temperature of about 200° C. at the time of operation. However, due to recent increase of rate of operation and various measures taken to prevent public nuisance, it has now been required for them to be usable at a temperature of about 300° C.–350° C.

Further since the properties of joint become deteriorated suddenly when the temperature of a welded boundary surface at the time of welding exceeds a certain value, the welding must be carried out under sufficient supervision so as not to allow the temperature of this part to rise over 450° C.

The above-mentioned fact is also applicable to the case of the joint consisting of stainless steel and aluminum used for vessels of liquid oxygen. In this case, the deterioration of air-tightness at the boundary surface between stainless steel and aluminum due to welding heat will be a problem.

We have made strenuous studies in order to overcome the above-mentioned drawbacks and as a result, we have discovered a joint which does not require so severe supervision at the time of welding, can withstand much higher operation temperature than the conventional one and is superior in air-tightness of boundary surface. This joint is a clad metal obtained by laying titanium between steel and aluminum and welding them by explosion.

An explosive welding is a method for producing composite metals by striking two or more pieces of metals against each other instantaneously at room temperature to joint them by using explosion energy of an explosive compound.

The strength of adhesion of the composite metals obtained according to this method is considerably strong compared with those obtained according to conventional welding procedure, such as friction welding, welding carried out after specially alloying treatment and the like.

Joints obtained according to an explosive welding are not produced, piece by piece, according to desired size but they are produced by a procedure in which 100 to 200 pieces are collected to a large sheet and given sizes of sheets are cut therefrom. Accordingly, the sizes of joints are determined according to the conditions at the time of use e.g. current density, temperature, etc.

As for thickness of titanium plates, it is preferable to use plates as thin as possible from the view point of cost so long as it is in the range of the conditions necessary for a common explosive welding, e.g. about 1.5–2 mm.

As for thickness of aluminum material, it is in the range from the thickness which does not allow melting to reach the adhered boundary of a joint at the time of welding of the aluminum of the joint with an aluminum material to be adhered (more than 4 mm.), to the thickness which allows the explosive welding to be performed (20 mm.).

As for thickness of steel material, it is in the range where melting does not reach the adhered boundary of a joint at the time of welding of the steel of the joint with the steel to be welded.

The reason why resistance to higher temperature can be attained by laying titanium between steel and aluminum is not clear but it is believed that even when diffusion of component is caused by heat, it does not act ot weaken the binding forces between steel and titanium and between titanium and aluminum.

The joint (or jointing material) consisting of steel, titanium and aluminum according to the present invention, does not require so delicate and careful attention as was required for conventional joint at the time of use. Moreover since it withstands so high a temperature as was unusable in case of conventional joint, it serves the purpose not only in the increase of productivity but also in the prevention of public nuisance in aluminum purification industry.

As above-mentioned the steels used in the present invention include not only carbon steel but also stainless steel. As for aluminum, it includes not only pure aluminum but also all the aluminum alloys which do not contain magnesium.

Further since the present invention is directed to the joints consisting of steel, titanium and aluminum which are characterized in being welded by explosion, it is not always necessary that they are constructed with three layers of steel-titanium-aluminum.

For example, it is also possible to make them 5-layer-clad such as carbon steel-stainless steel-titanium-pure aluminum-corrosion resistance aluminum.

The following examples will further illustrate this invention, but it is not intended to limit the scope of the invention.

EXAMPLE 1

One side of a veneer plate having a thickness of 3 mm., a width of 100 mm. and a length of 530 mm. is superposed upon and adhered to one side of an industrial grade of pure titanium plate (JIS, H4600:TP28) having a thickness of 2 mm., a width of 530 mm. and a length of 930 mm. with a superimposed area of a 100 mm. width from the edge of the side. Said titanium plate having an adhered veneer plate is placed above a mild steel plate (JIS, G3101:SS41) polished to a surface roughness of about 1 micron and having a thickness of 15 mm., a width of 500 mm. and a length of 900 mm. while keeping a distance of 2 mm. between the two plates by inserting spacers of steel ball. Carton boards having a width of 50 mm. were set up along each side of the plate consisting of the veneer plate and the titanium plate to form a box-like enclosed space in which an explosive compound for explosive welding consisting of 10% by weight of PETN (pentaerithritol tetranitrate), 87% by weight of ammonium nitrate and 3% by weight of starch was charged in a uniform thickness and in a proportion of 9 kg. per square meter. A percussion cap was set up in the middle of the long side of the veneer plate and detonation was initiated to effect explosive welding whereby a clad plate having a total thickness of 17 mm., a width of 500 mm. and a length of 900 mm. was produced. The marginal part of the industrial grade pure titanium plate at the outside of the mild steel was cut to the same size with that of the mild steel plate by the explosive power at the time of explosive welding.

The unevenness of the surface of the resultant clad plate was corrected and the surface of an industrial grade pure titanium plate was polished to a surface roughness of about 1 micron. Then, above this industrial grade pure titanium plate, was placed an aluminum plate (JIS, H4101:A1050P—H/2) having a thickness of 5 mm., a width of 530 mm. and a length of 930 mm., to the one side of which a veneer plate having a thickness of 3 mm., a width of 100 mm. and a length of 530 mm. was adhered to give a superimposed zone of 10 mm., while keeping a distance of 3 mm. between the titanium plate and the aluminum plate and carton boards of 50 mm. width were set up along each side to form a box-like enclosure.

In this box an explosive compound for explosive welding consisting of 10% by weight of PETN, 87% by weight ammonium nitrate and 3% by weight of starch were charged up to a uniform thickness, in a proportion of 15 kg. per square meter. A percussion cap of No. 6 was set up in the middle of the long side of the veneer plate and by initiating the detonation explosive welding was conducted to produce a clad plate consisting of three layers of the mild steel plate, the industrial grade pure titanium plate and the pure aluminum plate, and having a total thickness of 22 mm., a width of 500 mm. and a length of 900 mm.

The marginal part of the pure aluminum plate at outside of the clad plate consisting of the industrial grade titanium plate and the mild steel plate was cut by the explosion power at the time of explosive welding likewise as in case of the titanium plate.

A plate having 50 mm. sides was cut off from this clad plate, and to the middle of this square plate, one end of a mild steel square rod (JIS, G3101:SS41) having sides of 30 mm. and a length of 200 mm. was jointed by a common electric welding sufficiently while keeping the angle of 90° between the square plate and the rod. Then approximately in the middle of the aluminum side surface of the plate, an aluminum square rod (JIS, H4161:A$_1$B$_1$—F) having sides of 30 mm. and a length of 200 mm. was set up perpendicularly to the plate and the one of the rod was jointed with the plate sufficiently by a common argon arc welding procedure. The temperature of the joint was elevated by these weldings up to about 500° C. but the boundary surface welded by explosive welding kept sound state without showing any sign of detachment.

After the total body of the joint was kept at 500° C. for 5 hours, it was cooled and a tensile load was applied in the direction of rod axis, and the welded part of the aluminum rod and the joint was broken but there was no change in the joint itself proving the superiority of its strength.

Thereafter a cold chisel was struck to the boundary surface of titanium and aluminum of the joint to force to effect delamination but only the aluminum material was cut and there was no sign of the delamination at the boundary surface.

Similar test was conducted with regard to the boundary surface between titanium and steel, and showed a strong delamination resistance as well.

On the other hand, for comparison's sake, an aluminum plate (JIS, H4101:A$_1$P$_1$—½H) having a thickness of 5 mm. was welded with a carbon steel plate (JIS, G3101:SS41) having a thickness of 17 mm. by a common explosive welding procedure to produce a clad plate from which a 50 mm. square joint was cut. To the resultant joints, a steel rod and an aluminum rod were welded separately as in the above-mentioned case.

The temperature of the joints was elevated by the welding up to 500° C. and detachment was observed at a portion of the welded boundary part. Further after the entire body of the joint was kept at 500° C. for one hour and cooled, a tensile load was applied in the axial direction of the rods. Detachment occurred from the boundary surface welded by explosive welding even when almost no load was applied.

EXAMPLE 2

A titanium plate (JIS, H4600:TP28) having a thickness of 2 mm. was adhered to a stainless steel plate (JIS, G4304:SUS27) having a thickness of 12 mm. by a common explosive welding method and then an aluminum plate (JIS, H4101:A$_1$P$_1$—½H) having a thickness of 5 mm. was likewise adhered by explosive welding upon the titanium surface to produce a three layered clad plate consisting of stainless steel, titanium and aluminum having a total thickness of 19 mm., a width 500 mm., and a length of 900 mm.

From this clad plate, a ring having an outside diameter of 43 mm., a thickness of 5 mm. and a height of 19 mm. was cut out to produce a pipe joint.

With the steel side of this joint, a stainless steel (JIS, G3459:SUS27TP) having a nominal diameter of 32 mm., a schedule of 80 mm., a length of 200 mm. was brought face to face and jointed sufficiently by butt-welding according to a common electric welding procedure. Then an aluminum pipe (JIS, H4141:A$_1$T$_1$—H) having an outside diameter of 40 mm., a thickness of 3.5 mm. and a length of 200 mm. was brought face to face with the aluminum side of this joint and sufficiently welded according to a common argon welding procedure.

By such welding, the temperature of the joint rose and reached 550° C. but the boundary surface having been adhered by explosive welding did not show detachment and maintained a sound state.

After welding a stainless steel plate and an aluminum plate, respectively to the openings of the ends of the stainless steel pipe and the aluminum pipe both having been welded to a joint, and completing the sealing, a small hole was drilled on a stainless steel plate and test for air-tightness was carried out by evacuating with a vacuum pump. There was observed no leakage at all and the superiority of air-tightness was demonstrated.

When a tensile load was applied in the axial direction of this pipe, breakage occurred at the welded part between the aluminum pipe and the joint but the joint itself showed no sign of change at all. Thus the superiority of strength was demonstrated.

On the other hand, for comparison, a pipe joint having the same size as that of the above-mentioned was cut out from a clad plate obtained by the explosive welding of a stainless steel plate (JIS, G4304:SUS27) having a thickness of 14 mm. with an aluminum plate (JIS, H4101: A$_1$P$_1$—½H) having a thickness of 5 mm. by a common procedure and likewise a stainless steel pipe and an aluminum piper were welded as in the above-mentioned case. The temperature of the joint reached 550° C. but no apparent change was observed on the surface welded by the explosive welding.

When a similar air-tightness test was carried out, a slight leakage was observed.

Further when a tensile load was applied as in the above-mentioned case, detachment occurred from the adhered boundary surface between the aluminum and the stainless steel with almost no load state.

We claim:

1. A joint for joining steel and aluminum comprising a multi-layer plate having layers of steel, titanium and aluminum, the titanium being positioned intermediate the layers of steel and aluminum and the bonds between the titanium and steel layers and the titanium and aluminum layers having been formed by explosive welding.

2. A joint according to claim 1 wherein steel is a carbon steel.

3. A joint according to claim 1 wherein steel is a stainless steel.

4. A joint according to claim 1 wherein steel consists of layers of two different kinds of steel and/or steel alloy.

5. A joint according to claim 1 wherein aluminum is pure aluminum.

6. A joint according to claim 1 wherein aluminum is aluminum alloy other than those containing magnesium.

7. A joint according to claim 1 wherein aluminum consists of layers of two different kinds of aluminum and/or aluminum alloy.

References Cited

UNITED STATES PATENTS

| | | | |
|---|---|---|---|
| 2,908,073 | 10/1959 | Dulin | 29—197 |
| 2,985,955 | 5/1961 | Rostoker | 29—198 |
| 3,219,474 | 10/1959 | Priceman | 29—197 |
| 3,233,312 | 2/1966 | Cowan | 29—197 |
| 3,359,142 | 12/1967 | Ward | 29—197 |

HYLAND BIZOT, Primary Examiner

U.S. Cl. X.R.

29—197, 198